United States Patent
Bar-Haim et al.

(10) Patent No.: US 10,591,839 B2
(45) Date of Patent: Mar. 17, 2020

(54) LIQUID ELECTROPHOTOGRAPHIC INK COMPOSITION

(71) Applicant: HP Indigo B.V., Amstelveen (NL)

(72) Inventors: Gil Bar-Haim, Holon (IL); Shiran Zabar, Nes Ziona (IL); Danny Feldman, Nes Ziona (IL); Alina Grishman, Rehovot (IL); Albert Teishev, Rishon le-zion (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/094,439

(22) PCT Filed: Jul. 28, 2016

(86) PCT No.: PCT/EP2016/068064
§ 371 (c)(1),
(2) Date: Oct. 17, 2018

(87) PCT Pub. No.: WO2018/019379
PCT Pub. Date: Feb. 1, 2018

(65) Prior Publication Data
US 2019/0119512 A1   Apr. 25, 2019

(51) Int. Cl.
| | |
|---|---|
| *G03G 9/12* | (2006.01) |
| *C09D 11/10* | (2014.01) |
| *G03G 9/135* | (2006.01) |
| *C09D 11/03* | (2014.01) |
| *G03G 9/08* | (2006.01) |
| *C09D 11/037* | (2014.01) |

(52) U.S. Cl.
CPC ............ *G03G 9/122* (2013.01); *C09D 11/03* (2013.01); *C09D 11/037* (2013.01); *C09D 11/10* (2013.01); *G03G 9/0804* (2013.01); *G03G 9/135* (2013.01); *G03G 9/1355* (2013.01)

(58) Field of Classification Search
None
See application file for complete search history.

(56) References Cited

U.S. PATENT DOCUMENTS

| | | | | |
|---|---|---|---|---|
| 4,061,581 A | * | 12/1977 | Leleu | ............ C10M 3/00 |
| | | | | 508/287 |
| 4,702,984 A | * | 10/1987 | El-Sayed | ........... G03G 9/131 |
| | | | | 430/115 |
| 5,200,164 A | | 4/1993 | Medalia et al. | |
| 5,204,207 A | * | 4/1993 | Yamashita | ............ G03G 9/122 |
| | | | | 430/114 |
| 5,846,306 A | * | 12/1998 | Kubota | .................. C09D 11/32 |
| | | | | 106/31.75 |
| 6,806,013 B2 | | 10/2004 | Morrison et al. | |
| 9,023,571 B2 | * | 5/2015 | Yamada | ................ G03G 9/132 |
| | | | | 430/112 |
| 9,341,916 B2 | | 5/2016 | Telfer et al. | |
| 2008/0043081 A1 | * | 2/2008 | Masumi | ............. C09D 11/101 |
| | | | | 347/102 |
| 2011/0266347 A1 | | 11/2011 | Grinwald et al. | |
| 2012/0107579 A1 | * | 5/2012 | Grinwald | ............ C09D 11/326 |
| | | | | 428/195.1 |
| 2013/0016420 A1 | | 1/2013 | Yeo et al. | |
| 2015/0064424 A1 | | 3/2015 | Negreanu et al. | |
| 2015/0210877 A1 | | 7/2015 | Grinwald et al. | |

FOREIGN PATENT DOCUMENTS

| | | | |
|---|---|---|---|
| EP | 2444462 | | 4/2012 |
| JP | 2011-008069 A | * | 1/2011 |
| WO | WO 2012082129 | | 6/2012 |
| WO | WO 2013044991 | | 4/2013 |
| WO | WO 2014015897 | | 1/2014 |
| WO | WO 2015165541 | | 11/2015 |
| WO | WO 2016008548 | | 1/2016 |
| WO | WO 2016119904 | | 8/2016 |

OTHER PUBLICATIONS

ESPACENET machine-assisted English-language translation of JP 2011-008069 (A) (pub. Jan. 2011). (Year: 2011).*
International Search Report and Written Opinion for International Application No. PCT/EP2016/068064 dated Sep. 26, 2016, 12 pages.

* cited by examiner

*Primary Examiner* — Janis L Dote
(74) *Attorney, Agent, or Firm* — HP Inc. Patent Department

(57) ABSTRACT

Herein is described a liquid electrostatic ink composition comprising a carrier liquid, a resin, a colorant selected from a magenta colorant, a cyan colorant and a black colorant, an amine-containing basic dispersant having a total base number (TBN) in the range of about 10 to about 65 mgKOH/g material, the amine-containing basic dispersant present in an amount from about 5 wt. % to about 40 wt. % by total weight of colorant.

6 Claims, No Drawings

LIQUID ELECTROPHOTOGRAPHIC INK COMPOSITION

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, a liquid electrophotographic (LEP) ink composition including ink particles in a liquid carrier can be charged by applying a developing voltage to the LEP ink composition to provide charged ink particles which are then brought into contact with the selectively charged photoconductive surface. The charged ink particles adhere to the image areas of the latent image while the background areas remain clean. The image is then transferred to a print substrate (e.g. paper) directly or, by being first transferred to an intermediate transfer member, which can be a soft swelling blanket, which is often heated to fuse the solid image and evaporate the liquid carrier, and then to the print substrate.

Some previous LEP ink compositions comprising cyan, magenta or black colorants have been found to suffer from electrical fatigue. Electrical fatigue may cause the charging property of a LEP ink composition to change, for example an increase in particle conductivity, when exposed to electrical fields for prolonged periods of time. If particle conductivity of the LEP ink composition changes, the number of particles transferred to the photoconductive surface in a liquid electrostatic printing process changes for a given developing voltage, resulting in a different thickness of ink being transferred to the print substrate which may cause a decline in the optical density of the printed image. Some previous solutions to this problem include correcting the developing voltage applied to the LEP ink composition in order to preserve the optical density.

DETAILED DESCRIPTION

Before the compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid", "carrier," or "carrier vehicle" refers to the fluid in which the polymer resin, colorant, basic dispersant, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, generally suitable for use in an electrostatic printing process, sometimes termed an electrophotographic printing process. The electrostatic ink composition may include chargeable particles of resin and a colorant dispersed in a liquid carrier, which may be as described herein.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise. In some examples, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless specified otherwise, wt % values are to be taken as referring to a weight-for-weight (w/w) percentage of solids in the ink composition, and not including the weight of any carrier fluid present.

The present inventors have observed that the problem of electrical fatigue is particularly severe when running low print coverage jobs, for example a coverage of less than 40%, such as less than 30%, less than 20% or less than about 10%. The present inventors have also observed that the problem of electrical fatigue is most prominent in inks comprising colorants having highly conjugated chemistry, e.g. cyan, black and magenta colorants, e.g. cyan and black colorants. The present inventors have observed that increasing the developing voltage in an attempt to counter the electrical fatigue problem may lead to other problems such as deposition of ink particles in background areas and other print quality issues, particularly for colorants comprising a conjugated compound such as a conjugated aromatic compound, for example colorants comprising conjugated compounds (i.e. compounds with a conjugated chemistry) and having an acidic surface, for example a mildly acidic surface. Additionally, increasing the developing voltage to counteract the problem of electrical fatigue may only be effective up to the maximum developing voltage, after this the developing voltage cannot be increased and so the effect of electrical fatigue cannot be overcome. Without wishing to be bound by theory, the inventors have found that such conjugated compounds, compounds which may be present in magenta, cyan and/or black colorants, are particularly effected by electrical fatigue, for example colourants comprising conjugated compounds and having an acidic surface. It is thought that the electrical fatigue problem may be caused by an electrostatic separation of the acid group which is then stabilized by the conjugated chemistry of the colourant. The present inventors have surprisingly found that providing an LEP ink composition comprising an amine-containing basic dispersant having a total base number (TBN) of less than about 70 mg/KOH/g material may reduce the problem of electrical fatigue as well as minimising side effects such as background effects and other print quality issues (e.g. increased dot size and blanket memory effects), for example print quality problems which may be caused by high developing voltages.

Unless otherwise stated, any feature described herein can be combined with any aspect or any other feature described herein.

Described herein is a liquid electrophotographic (LEP) ink composition comprising a carrier liquid, a resin, a colorant and a basic dispersant, for example a basic dispersant, such as an amine-containing basic dispersant, having a total base number (TBN) in the range of about 10 to less than about 70 mgKOH/g material.

Also described herein is a method of producing a LEP ink composition comprising combining a carrier liquid, a resin, a colorant and a basic dispersant, for example a basic dispersant, such as an amine-containing basic dispersant, having a total base number (TBN) in the range of about 10 to less than about 70 mgKOH/g material.

In an aspect there is provided a liquid electrophotographic (LEP) ink composition. The LEP ink composition may comprise:
  a carrier liquid;
  a resin;
  a colorant selected from a magenta colorant, a cyan colorant and a black colorant; and
  an amine-containing basic dispersant having a total base number (TBN) in the range of about 10 to about 65 mgKOH/g material, the amine-containing basic dispersant present in an amount from about 5 wt. % to about 40 wt. % by total weight of colorant.

In another aspect there is provided a method of producing a LEP ink composition. The method may comprise combing:
  a carrier liquid;
  a resin;
  a colorant selected from a magenta colorant, a cyan colorant and a black colorant; and
  an amine-containing basic dispersant having a total base number (TBN) in the range of about 10 to about 65 mgKOH/g material, the amine-containing basic dispersant present in an amount from about 5 wt. % to about 40 wt. % by total weight of colorant.

Colorant

The LEP ink (pigmented LEP ink) includes a colourant. The colorant may be selected from a magenta colorant, a cyan colorant and a black colorant. The colorant may be a dye or pigment. The colorant can be any colorant compatible with the liquid carrier and useful for electrophotographic printing. For example, the colorant may be present as pigment particles, or may comprise a resin (in addition to the polymers described herein) and a pigment.

In some examples, the colorant comprises a conjugated compound, for example an aromatic conjugated compound. As used herein "conjugated compound" is used to describe a compound comprising a conjugated system, i.e. a system which allows delocalised electrons, e.g. pi electrons, across adjacent atoms. A conjugated system may be a region of overlapping p-orbitals which may bridge single bonds within a molecule and allow the delocalization of electrons at least a region of the molecule. Examples of conjugated compounds are phthalocyanines, graphite, quinacridones, anthraquinones, anthrones, diketopyrrolopyrroles, perylenes, perinones, phthaleins, pyranthrones, thioindigoids, pyrazoloquinazolinones, heterocyclic compounds (for example a heterocyclic compound having conjugated chemistry, such as a nitrogen containing heterocyclic compound having conjugated chemistry, such as isoindolines and pyrrolediones), benzimidazolones, or indanthrones.

In some examples, the colorant comprises a phthalocyanine, carbon black (for example carbon black including graphite), quinacridone, anthraquinone, anthrone, diketopyrrolopyrrole, perylene, perinone, phthalein, pyranthrone, thioindigoid, pyrazoloquinazolinone, heterocyclic compound (for example a heterocyclic compound having conjugated chemistry, such as a nitrogen containing heterocyclic compound having conjugated chemistry), benzimidazolone, or a indanthrone.

In some examples, the colorant comprises a phthalocyanine, carbon black (for example carbon black including graphite), quinacridone, anthraquinone, anthrone, diketopyrrolopyrrole, perylene, perinone, phthalein, pyranthrone, thioindigoid, pyrazoloquinazolinone, isoindoline, pyrroledione, benzimidazolone, or an indanthrone.

In some examples, the colorant comprises:

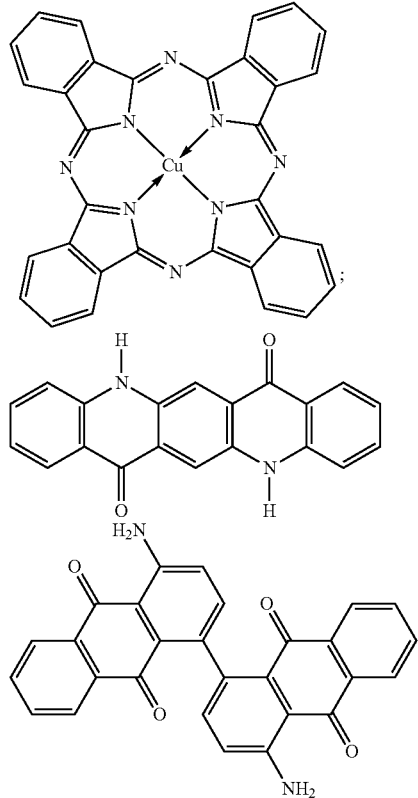

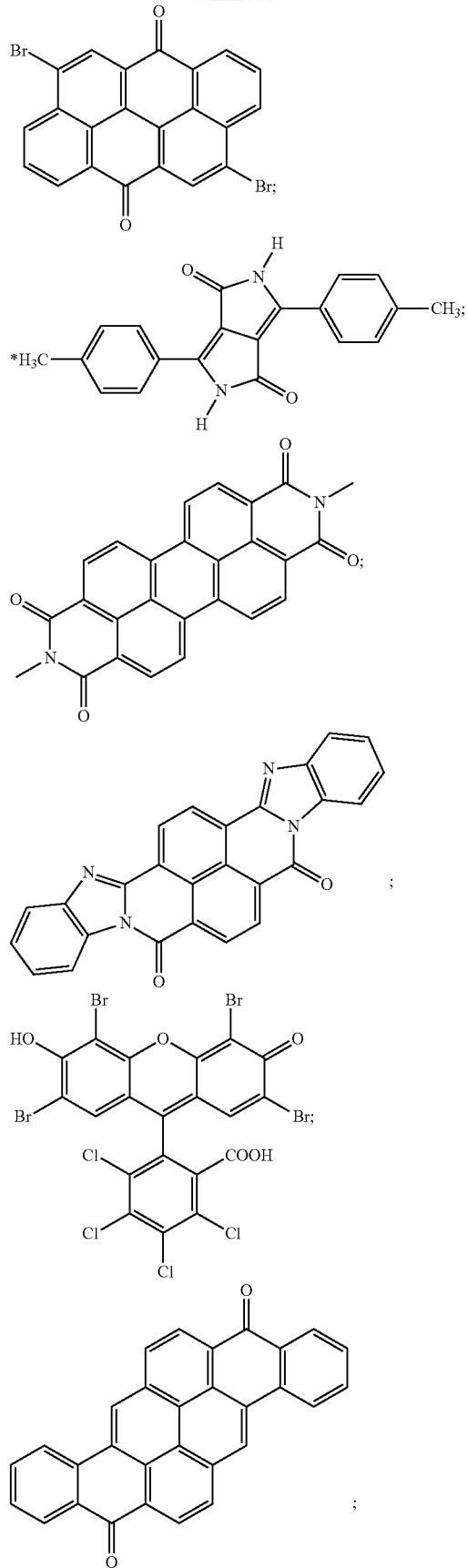

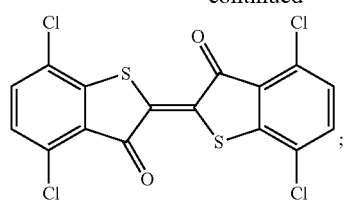

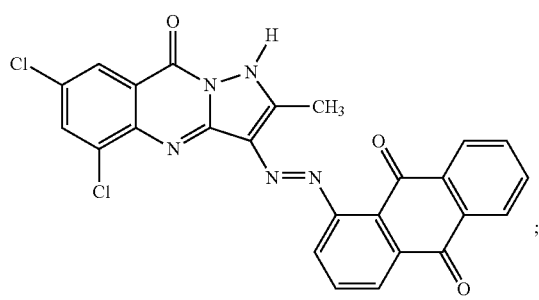

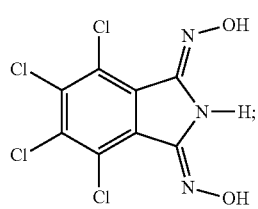

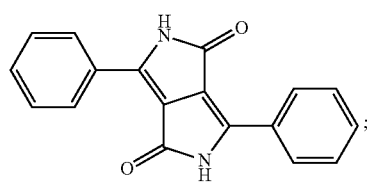

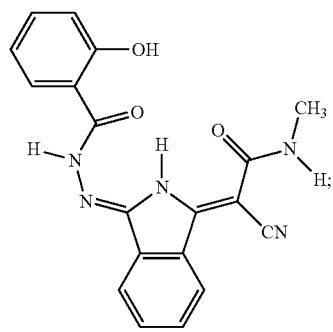

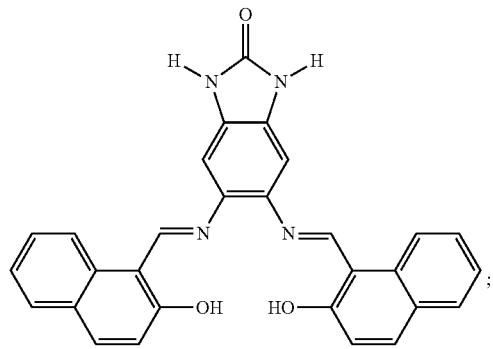

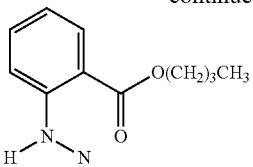

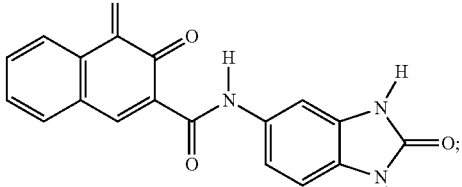

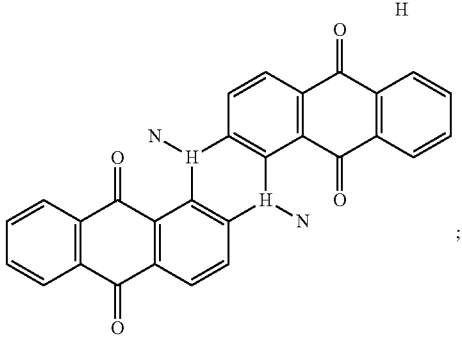

graphite; or derivatives thereof.

In some examples, the colorant is a magenta colorant. In some examples, the magenta colorant comprises a quinacridone, anthraquinone, anthrone, diketopyrrolopyrrole, perylene, perinone, phthalein, pyranthrone, thioindigoid, pyrazoloquinazolinone, heterocyclic compound, benzimidazolone, or an indanthrone. In some examples, the magenta colorant comprises a pigment selected from pigment violet 19, pigment red 177 (C.I. 65300), pigment red 168 (C.I. 59300), pigment red 272 (C.I. 561150), pigment red 179 (C.I. 71130), pigment red 194 (C.I. 71100), pigment red 174 (C.I. 45410:2), pigment red 216 (C.I. 59710), pigment red 88 (C.I. 73312), pigment red 251 (C.I. 12925), pigment red 257 (C.I. 562700), pigment red 208 (C.I. 12514), pigment red 255 (C.I. 561050), pigment red 271 (C.I. 487100), pigment orange 68 (C.I. 486150), or combinations thereof.

In some examples, the colorant is a cyan colorant. In some examples the cyan colorant comprises a phthalocyanine, for example

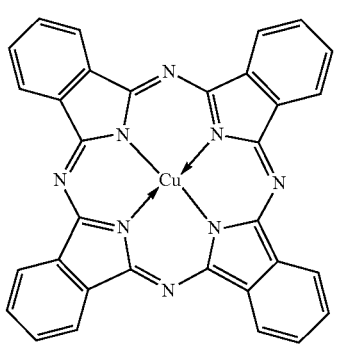

Examples of colorants comprising a phthalocyanine include pigments selected from pigment blue 15:1, pigment blue 15:2, pigment blue 15:3, pigment blue 15:4, pigment blue 15:6, pigment blue 16, pigment blue 17, pigment blue 75, pigment blue 79, pigment green 7, pigment green 13, and pigment green 36.

In some examples, the colorant is a black colorant. In some examples the black colorant comprises carbon black, for example the black colorant may comprise graphite.

In some examples, the colorant is an acidic colorant, e.g. an acidic pigment. An acidic pigment may be defined as a pigment that, when in water at 20° C., has a pH value of less than 7, in some examples less than 6, in some examples less than 5, in some examples less than 4, in some examples less than 3. An acidic pigment may be defined as a particulate pigment that has acidic groups (for example a carboxylic acid group, sulfonic acid group or any Lewis acid) on the surface of the particles of the pigment. In some examples, the colorant is a mildly acidic colorant, for example a colorant having a pH in the range of about 3 to less than about 7, about 4 to less than about 7, about 5 to less than about 7, or about 6 to less than about 7. Methods of determining the pH of a substance are well known to the skilled person, for example the method described in ISO Standard 31-8 Annex C. pH may be measured in water at 20° C. In some examples, the total acid number of an acidic colorant may be determine by measuring the number of acid groups neutralized by titration with an alkali.

The colorant or pigment particle may be present in the LEP ink composition in an amount of from about 10 wt % to about 80 wt % by total weight solids of the LEP ink, in some examples about 10 wt % to about 60 wt %, in some examples about 10 wt % to about 50 wt %, in some examples about 10 wt % to about 40 wt %, in some examples about 10 wt % to about 30 wt %, in some examples about 15 wt % to about 30 wt % weight solids of the LEP ink. In some examples, the colorant or pigment particle may be present in the LEP ink in an amount of at least about 10 wt % weight solids of the LEP ink, for example at least about 15 wt % weight solids of the LEP ink.

In some examples, the LEP ink composition comprises ink particles, for example ink particles comprising a resin and a colorant. In some examples, the ink particles comprise a resin, a colorant and a basic dispersant. The ink particles may be provided with a pigment loading of about 5-40% w/w, in some examples about 10-30% w/w. The term "pigment loading" may be used to refer to the amount of colourant by total weight of solids of the LEP ink composition. In some examples, the term "pigment loading" refers to the average content of the colourant in the ink particles. In some examples, the pigment loading refers to the average wt % of the colorant in the ink particles.

Basic Dispersant

The LEP ink composition comprises a basic dispersant. The basic dispersant may be a basic polymeric dispersant. In some examples, the basic polymeric dispersant comprises a basic anchor group, e.g. an amine group. In some examples, each basic polymeric dispersant molecule comprises a multi amine anchor group or a single amine anchor group, in some examples each basic polymeric dispersant molecular comprises a multi amine anchor group. In some examples, the basic polymeric dispersant comprises polyolefin amide alkeneamine.

In some examples, the basic polymeric dispersant comprises a co-polymer. In some examples, the basic polymeric dispersant comprises a block co-polymer having multiple anchor groups, for example an ABA block co-polymer or a BAB block co-polymer or a random copolymer. In some examples, the polymeric dispersant comprises a comb co-polymer.

In some examples, the basic dispersant is or comprises a succinimide. The succinimide may be linked, e.g. via a hydrocarbon-containing linker group, to an amine group. In some examples, the dispersant comprises a polyisobutylene succinimide having a head group comprising an amine.

In some examples, the basic dispersant is of formula (I)

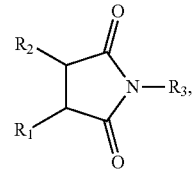

formula (I)

wherein $R_1$, $R_2$ and $R_3$ are selected from an amine-containing head group, a hydrocarbon tail group and hydrogen,
wherein at least one of $R_1$, $R_2$ and $R_3$ comprises a hydrocarbon tail group,
at least one of $R_1$, $R_2$ and $R_3$ comprises an amine-containing head group. In some examples, $R_1$ and $R_2$ are selected from a hydrocarbon tail group and hydrogen, with at least one of $R_1$ and $R_2$ comprising a hydrocarbon tail group, and $R_3$ comprises an amine-containing head group. The hydrocarbon tail group may comprise or be a hydrocarbon group, which may be branched or straight chain and may be unsubstituted. The hydrocarbon tail group may comprise or be a hydrocarbon group containing a polyalkylene, which may be selected from a polyethylene, polypropylene, polybutylene. In some examples, the hydrocarbon tail group may contain a polyisobutylene. The hydrocarbon tail group may contain from 10 to 100 carbons, in some examples from 10 to 50 carbons, in some examples from 10 to 30 carbons. The hydrocarbon tail group may be of the formula (II)

P-L-     formula (II), wherein P is or comprises polyisobutylene and L is selected from a single bond, $(CH_2)_n$, wherein n is from 0 to 5, in some examples 1 to 5, —O— and —NH—. In some examples, the amine-containing head group comprises or is a hydrocarbon group having an amine group attached to one of the carbons of the hydrocarbon group. In some examples, the amine-containing head group is of the formula (III)

$(CH_2)_m[(CH_2)_o NH(CH_2)_p]_q(CH_2)_r$—$NH_2$     formula (III), wherein m is at least 1, in some examples 1 to 5, q is 0 to 10, o is 0, 1 or 2, p is 1 or 2, r is 0 to 10; in some examples, m is 1, o is 1, p is 1 and q is from 0 to 10, in some examples from 1 to 5, and in some examples r is 1 to 5; in some examples m is 1, q is 0 to 10, in some examples 1 to 10, in some examples 1 to 5, o is 1, p is 1, r is 1.

In some examples, the dispersant is of formula (I), wherein $R_1$ is of formula (II), $R_2$ is H and $R_3$ is of formula (III). In some examples, the dispersant is of formula (I), wherein $R_1$ is of formula (II), wherein L is —$CH_2$—, $R_2$ is H and $R_3$ is of formula (III), wherein m is 1, q is 0 to 10, in some examples 1 to 10, in some examples 1 to 5, o is 1, p is 1 and r is 1. In some examples, the dispersant is or comprises polyisobutylene succinimide polyethylene amine non-ionic dispersant. In some examples, the basic dispersant is or comprises SOLSPERSE® J560 and/or LUBRIZOL® 6406.

In some examples, the basic dispersant has a total base number (TBN) of at least about 5 mgKOH/g material, in some examples a TBN of at least about 10 mgKOH/g material, in some examples a TBN of at least about 20 mgKOH/g material, in some examples a TBN of at least about 30 mgKOH/g material. In some examples the basic dispersant has a total base number (TBN) of from about 5 mgKOH/g material to about 65 mgKOH/g material, in some examples from about 5 mgKOH/g material to about 60 mgKOH/g material, in some examples from about 10 mgKOH/g material to about 60 mgKOH/g material, in some examples from about 15 mgKOH/g material to about 55 mgKOH/g material, in some examples from about 15 mgKOH/g material to about 50 mgKOH/g material, in some examples from about 15 mgKOH/g material to about 45 mgKOH/g material, in some examples from about 20 mgKOH/g material to about 45 mgKOH/g material, in some examples from about 25 mgKOH/g material to about 50 mgKOH/g material, in some examples from about 25 mgKOH/g material to about 45 mgKOH/g material, in some examples from about 30 mgKOH/g material to about 50 mgKOH/g material, in some examples from about 30 mgKOH/g material to about 45 mgKOH/g material, in some examples from about 35 mgKOH/g material to about 50 mgKOH/g material, in some examples from about 35 mgKOH/g material to about 45 mgKOH/g material, in some examples from about 40 mgKOH/g material to about 50 mgKOH/g material, in some examples from about 40 mgKOH/g material to about 50 mgKOH/g material, in some examples from about 45 mgKOH/g material to about 50 mgKOH/g material, in some examples from about 40 mgKOH/g material to about 45 mgKOH/g material.

In some examples, the dispersant is a basic dispersant having a total base number (TBN) of from about 30 mgKOH/g material to about 60 mgKOH/g material, in some examples from about 35 mgKOH/g material to about 55 mgKOH/g material, in some examples about 45 mgKOH/g material.

In some examples, the dispersant is a basic dispersant having a total base number (TBN) of less than about 70 mgKOH/g material, in some examples less than about 65 mgKOH/g material, in some examples less than about 60 mgKOH/g material, in some examples less than about 55 mgKOH/g material, in some examples less than about 50 mgKOH/g material.

Total base number (TBN), sometimes simply referred to as base number, may be determined using standard techniques, including, those laid out in ASTM Designation D4739-08, such as Test Method D2896, Test Method D4739, and ASTM Designation D974-08, with Test Method D2896 being used if any discrepancy is shown between test methods, and unless otherwise stated, the test method(s) will be the most recently published at the time of filing this patent application. "mgKOH/g material" indicates "mgKOH per gram of dispersant". The measurement of TBN of the dispersant can either be on the pure dispersant, or a dispersant in water or a hydrocarbon liquid, such 60 wt % dispersant in white spirit, e.g. dearomatized white spirit, mineral oil or distillate (e.g. 010-20 hydrocarbons), and then adjusted as if it had been measured on the pure dispersant.

In some examples, the dispersant comprises a succinimide, which may be as described above, and the succinimide has a molecular weight (MW) of from 500 Daltons to 10,000 Daltons, in some examples a MW of from 1000 to 6,000 Daltons, in some examples a MW of from 1000 to 6,000 Daltons, in some examples a MW of from 1000 to 5000 Daltons, in some examples a MW of from 2000 to 4000 Daltons, in some examples a MW of about 3000 Daltons, or in some examples a MW of from 500 to 3000 Daltons, in some examples a MW of from 1000 to 2000 Daltons, in some examples a MW of from 1200 to 1900 Daltons, in some examples a MW of from 1400 to 1800 Daltons, in some examples a MW of 1700 Daltons.

The LEP ink composition may comprise 5-40 wt. % of dispersant by total weight of colorant. The amount of dispersant contained in the LEP ink composition may be referred to as the active amount of dispersant by weight of colorant, i.e. the % AOWP (the percentage agent on the weight of colorant (e.g. pigment)) is the number of grams of dispersant per 100 g of colorant (e.g. pigment). The % AOWP of the dispersant may be from 5% to 40%, in some examples from 8% to 40%, in some examples from 8% to 25%, in some examples from 8% to 20%, in some examples from 8% to 15%, in some examples from 10% to 30%, in some examples from 10% to 25%, in some examples from 10% to 20%.

The basic dispersant may constitute from 0.1 wt % to 12 wt % of the electrostatic ink composition, in some examples 0.5 wt % to 6 wt % the electrostatic ink composition, in some examples 1 wt % to 6 wt % of the electrostatic ink composition, in some examples 2 wt % to 4 wt % of the electrostatic ink composition.

Carrier Liquid

The electrostatic ink composition may include a liquid carrier. In some examples, the electrostatic ink composition comprises ink particles including the resin may be dispersed in the liquid carrier. The liquid carrier can include or be a hydrocarbon, silicone oil, vegetable oil, etc. The liquid carrier can include, for example, an insulating, non-polar, non-aqueous liquid that can be used as a medium for ink particles, i.e. the ink particles including the resin and a colorant, in some examples the resin, a colorant and a basic dispersant. The liquid carrier can include compounds that have a resistivity in excess of about $10^9$ ohm·cm. The liquid carrier may have a dielectric constant below about 5, in some examples below about 3. The liquid carrier can include hydrocarbons. The hydrocarbon can include, for example, an aliphatic hydrocarbon, an isomerized aliphatic hydrocarbon, branched chain aliphatic hydrocarbons, aromatic hydrocarbons, and combinations thereof. Examples of the liquid carriers include, for example, aliphatic hydrocarbons, isoparaffinic compounds, paraffinic compounds, dearomatized hydrocarbon compounds, and the like. In particular, the liquid carriers can include, for example, ISOPAR G™, ISOPAR H™, ISOPAR L™, ISOPAR M™, ISOPAR K™, ISOPAR V™, NORPAR 12™, NORPAR 13™, NORPAR 15™, EXXOL D40™, EXXOL D80™, EXXOL D100™, EXXOL D130™, and EXXOL D140™ (each sold by EXXON CORPORATION); TECLEN N-16™, TECLEN N-20™, TECLEN N-22™, NISSEKI NAPHTHESOL L™, NISSEKI NAPHTHESOL M™, NISSEKI NAPHTHESOL H™, #0 SOLVENT L™, #0 SOLVENT M™, #0 SOLVENT H™, NISSEKI ISOSOL 300™, NISSEKI ISOSOL 400™, AF-4™, AF-5™, AF-6™ and AF-7™ (each sold by NIPPON OIL CORPORATION); IP SOLVENT 1620™ and IP SOLVENT 2028™ (each sold by IDEMITSU PETROCHEMICAL CO., LTD.); AMSCO OMS™ and AMSCO 460™ (each sold by AMERICAN MINERAL SPIRITS CORP.); and Electron, Positron, New II, Purogen HF (100% synthetic terpenes) (sold by ECOLINK™).

Resin

The LEP ink composition may include a resin. For example the LEP ink composition may comprise ink particles comprise a resin and a colorant. In some examples, the ink particles comprise a resin, a colorant and a basic dispersant.

The ink particles may be chargeable particles, i.e. having or capable of developing a charge, for example in an electromagnetic field. The resin may be a thermoplastic resin. A thermoplastic polymer is sometimes referred to as a thermoplastic resin. The ink particles may be formed by combining the colorant and basic dispersant, for example by grinding, for example to provide colorant particles comprising the colorant and the basic dispersant. The colorant particles may then be combined with a resin, for example by grinding, to provide ink particles. The resin may coat the colorant, or colorant particles comprising the colorant and basic dispersant. The particles may include a core of colorant or colorant particles and have an outer layer of resin thereon. The colorant or colorant particles may be dispersed throughout each resin-containing particle. The outer layer of resin may coat the colorant or colorant particle partially or completely.

The resin typically includes a polymer. The resin can include, but is not limited to, a thermoplastic polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a copolymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is NUCREL 960 (from DuPont), and example of the second polymer is NUCREL 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the resin constitutes about 5 to 90%, in some examples about 5 to 80%, by weight of the solids of the electrostatic ink composition. In another example, the resin constitutes about 10 to 60% by weight of the solids of the electrostatic ink composition. In another example, the resin constitutes about 15 to 40% by weight of the solids of the electrostatic ink composition. In another example, the resin constitutes about 60 to 95% by weight, in some examples from 80 to 90% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the BYNEL® class of monomer, including BYNEL 2022 and BYNEL 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the NUCREL family of toners (e.g. NUCREL 403™, NUCREL 407™, NUCREL 609HS™, NUCREL 908HS™, NUCREL 1202HC™, NUCREL 30707™, NUCREL 1214™, NUCREL 903™, NUCREL 3990™, NUCREL 910™, NUCREL 925™, NUCREL 699™, NUCREL 599™, NUCREL 960™, NUCREL RX 76™, NUCREL 2806™, BYNEL 2002, BYNEL 2014, and BYNEL 2020 (sold by E. I. du PONT)), the ACLYN family of toners (e.g. ACLYN 201, ACLYN 246, ACLYN 285, and ACLYN 295), and the LOTADER family of toners (e.g. LOTADER 2210, LOTADER, 3430, and LOTADER 8200 (sold by Arkema)).

In some examples, the colorant constitutes a certain wt %, e.g. from 1 wt %, to 30 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a colorant and, in some examples, any other additives that may be present.

Charge Director

In some examples, the electrostatic ink composition includes a charge director. The charge director may be added to an electrostatic ink composition in order to impart and/or maintain sufficient electrostatic charge on the ink particles. In some examples, the charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium PETRONATE™, neutral Barium PETRONATE™, and basic Barium PETRONATE™), polybutylene succinimides (e.g. OLOA™ 1200 and AMOCO 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of an electrostatic ink composition.

The charge director may be added in order to impart and/or maintain sufficient electrostatic charge on the ink particles, which may be particles comprising the thermoplastic resin.

In some examples, the electrostatic ink composition comprises a charge director comprising a simple salt. The ions constructing the simple salts are all hydrophilic. The simple salt may include a cation selected from the group consisting of Mg, Ca, Ba, $NH_4$, tert-butyl ammonium, $Li^+$, and $Al^+$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F^-$, $ClO_4^-$, and $TiO_3^{4-}$ or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)3$, $LiCLO_4$ and $LiBF_4$, or any sub-group thereof.

In some examples, the electrostatic ink composition comprises a charge director comprising a sulfosuccinate salt of the general formula $MA_n$, wherein M is a metal, n is the valence of M, and A is an ion of the general formula (I): $[R^1—O—C(O)CH_2CH(SO_3^-) \ C(O)—O—R^2]$, wherein each of $R^1$ and $R^2$ is an alkyl group. In some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is Na, K, Cs, Ca, or Ba.

In some examples, the charge director comprises at least one micelle forming salt and nanoparticles of a simple salt as described above. The simple salts are salts that do not form micelles by themselves, although they may form a core for micelles with a micelle forming salt. The sulfosuccinate salt of the general formula $MA_R$ is an example of a micelle forming salt. The charge director may be substantially free of an acid of the general formula HA, where A is as described above. The charge director may include micelles of said sulfosuccinate salt enclosing at least some of the nanoparticles of the simple salt. The charge director may include at least some nanoparticles of the simple salt having a size of 200 nm or less, and/or in some examples 2 nm or more.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g (where mg/g indicates mg per gram of solids of the electrostatic ink composition).

Other Additives

The electrostatic ink composition may include another additive or a plurality of other additives. The other additive or plurality of other additives may be added at any stage of the method. The other additive or plurality of other additives may be selected from a charge adjuvant, a wax, a surfactant, viscosity modifiers, and compatibility additives. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket. In some examples, the LEP ink composition comprises silica, which may be added, for example, to improve the durability of images produced using the LEP ink.

In some examples, the electrostatic ink composition includes a charge adjuvant. A charge adjuvant may promote charging of the particles when a charge director is present. The method as described herein may involve adding a charge adjuvant at any stage. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), or hydroxy bis(3,5-di-tert-butyl salicylic) aluminate monohydrate. In an example, the charge adjuvant is or includes aluminum di- or tristearate. In some examples, the charge adjuvant is VCA (aluminium stearate and aluminium palmitate, available from Sigma Aldrich).

The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

The charge adjuvant may be present in an amount of less than 5.0% by weight of total solids of the electrostatic ink composition, in some examples in an amount of less than 4.5% by weight, in some examples in an amount of less than 4.0% by weight, in some examples in an amount of less than 3.5% by weight, in some examples in an amount of less than 3.0% by weight, in some examples in an amount of less than 2.5% by weight, in some examples about 2.0% or less by weight of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{10}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of a multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

Method of Producing a LEP Ink Composition

The method of producing a LEP ink composition may comprise combing a carrier liquid, a resin, a colorant selected from a magenta colorant, a cyan colorant and a black colorant, and from about 5 wt. % to about 40 wt. % by total weight of colourant of an amine-containing basic dispersant having a TBN of from about 10 to about 65 mgKOH/g material.

In some examples, the method comprises combining the colorant and the amine-containing basic dispersant, e.g. to form colorant particles, before adding the resin to the combined colorant and basic dispersant. In some examples, the method comprises combining the colorant and the amine-containing basic dispersant to form colorant particles before combining the colorant particles and the resin. In some examples, combining the colorant and the basic dispersant comprises grinding the colorant and basic dispersant. It is thought that combining the colorant and basic dispersant prior to adding the resin and optionally other additives such as a charge adjuvant etc., provides a LEP ink composition showing improved reduction in electrical fatigue and background effects.

In some examples, the method comprises adding a charge director to the electrostatic ink composition.

In some examples, the method comprises adding a charge adjuvant to the electrostatic ink composition. The charge adjuvant may be added to the electrostatic ink composition before, during or after the colorant, dispersant and resin are combined.

In some examples, the method comprises combining basic dispersant and colorant in a ratio of about 5:95 to about 40:60, for example about 10:90 to about 30:70, or about 10:90 to about 25:75.

In some examples, the method comprises combining the colorant and dispersant with a resin in a colorant and dispersant to resin ratio of about 20:80 to about 40:60, for example about 25:75 to about 35:65.

EXAMPLES

The following illustrates examples of the compositions and related aspects described herein. Thus, these examples should not be considered to restrict the present disclosure, but are merely in place to teach how to make examples of compositions of the present disclosure.

Example 1

A LEP ink composition was prepared by grinding 3080 g of a magenta pigment (Pigment Violet 19, a quinacridone pigment) and 621 g of a dispersant (372.6 g active dispersant) having a TBN of 45-50 mgKOH/g (SOLSPERSE® J560) in a S30 attritor for 9 hours at a temperature of 57° C., a speed of 165 rpm and a circulation flow rate of 15 kg/min. The resulting mixture was then ground (using the S30 attritor at a speed of 165 rpm and a circulation flow rate of 15 kg/min for 4 hours at 57° C., the 0.5 hour at 52° C., 0.5 hour at 45° C. and 29 hours at 40° C.) with 28710 g of a resin paste (mixture of NUCREL 699, available from DuPont, and A-C 5120, available from Honeywell in a 4:1 weight ratio in ISOPAR L at 25 wt. % solids), 82.5 g silica (DS72) and 275 g aluminium stearate (VCA, available from Sigma Aldrich) in the presence of a carrier liquid (ISOPAR L) to form a concentrated LEP ink.

The concentrated LEP ink was then diluted with additional carrier liquid (ISOPAR L) to 2% NVS to create a dispersion. The dispersion was then loaded with 250 mg/g of solids charge director (HP imaging agent) before printing. The magenta pigment loading of the LEP ink composition produced was 27.41% and the composition contained about 12% AWOP dispersant. The formulation of the Reference LEP ink composition is provided in table 1 below.

TABLE 1

| Example 1 LEP ink Composition | Mass (g) | wt. % by total solids |
|---|---|---|
| Magenta Pigment (Pigment Violet 19) | 3080 | 27.41 |
| Basic dispersant (SOLSPERSE ® J560) | 621 | 5.53 (3.32 wt. % active dispersant) |
| Resin paste (mixture of NUCREL 699, available from DuPont, and A-C 5120, available from Honeywell in a 4:1 weight ratio, in ISOPAR L) | 28710 | 63.88 |
| Aluminium stearate (VCA, Sigma Aldrich) | 275 | 2.45 |
| DS72 (Silica) | 82.5 | 0.73 |

Reference Example 1

A LEP ink composition was prepared by grinding 163.9 g of a magenta pigment (Pigment Violet 19, a quinacridone pigment), 2.11 of an amine-containing basic dispersant having a TBN of TBN of 70-80 mgKOH/g (SOLSPERSE® J561), 929.9 g of a resin paste of a resin paste (mixture of NUCREL 699, available from DuPont, and A-C 5120, available from Honeywell in a 4:1 weight ratio in ISOPAR L at 25 wt. % solids), 12.1 g aluminium stearate (VCA, available from Sigma Aldrich) and 3.6 g silica (DS72) in a S1 attritor at a speed of 250 rpm for 1.5 hours at 57° C. and 10.5 hours at 36° C.

The mixture containing the magenta pigment, basic dispersant, resin and aluminium stearate was then diluted with additional carrier liquid (ISOPAR L) to 2% NVS to create a dispersion. The dispersion was then loaded with 250 mg/g of solids charge director (HP imaging agent) before printing. The formulation of the LEP ink composition of Reference Example 1 is provided in table 2 below.

TABLE 2

| Reference Example 1 LEP ink Composition | Mass (g) | wt. % by total solids |
|---|---|---|
| Magenta Pigment (Pigment Violet 19) | 163.9 | 40.76 |
| Basic dispersant (SOLSPERSE ® J561) | 2.11 | 0.53 |
| Resin paste (mixture of NUCREL 699, available from DuPont, and A-C 5120, available from Honeywell in a 4:1 weight ratio) | 929.9 | 57.82 |
| Aluminium stearate (VCA, Sigma Aldrich) | 12.1 | 3.01 |
| DS72 (Silica) | 3.6 | 0.90 |

The compositions produced according to Reference Example 1 and Example 1 were printed onto print substrates (EUROART 135 gsm) using a LEP printing apparatus (HP Indigo 7000 press). The composition of each of Reference Example 1 and Example 1 were used to print 20000 impressions (20 kimp) at 2% coverage, the optical density (OD) of each of the prints was determined for the first print (i.e. 0 kimp), the $10000^{th}$ (10 kimp) print and/or the $20000^{th}$ (20 kimp) print, along with the particle conductivity (PC) and developer voltage (DRV) at 0 kimp, 10 kimp and/or 20 kimp as shown in Table 3 below. Every 5000 impressions (5 kimp) a background check print of 0% coverage was printed for 16 separations and the optical density determined for each of these prints using an X-rite optical densitometer in order to determine the background effect of each of the inks.

The OD, optical density, was measured using an optical densitometer from X-rite company (X-rite Exact). The conductivity parameter PC, particle conductivity, is calculated by the subtraction of LF, low field conductivity form HF, high field conductivity, where LF is measured using a LF probe and the HF is measured by Q/M device that measures electrophoretic conductivity at high field. DRV (developer roller voltage) indicates the absolute voltage of the developer roller of the binary ink developer units of the printing press. The printing press used recalibrates the DRV every 6000 impressions. Electrical fatigue is observed if the particle conductivity of the ink increases when exposed to continuously to a high electric field.

TABLE 3

| LEP Composition Example | OD drop (0-10 kimp) | OD drop (10-20 kimp) | Rise in PC over 20 kimp (pmho/cm) | Rise in DRV within first 20 kimp (V) |
|---|---|---|---|---|
| Ref. Ex. 1 | 0.07 | 0.1 | 20 | 50 |
| Ex. 1 | 0.15 | 0.05 | 20 | 30 |

The inventors found that both the compositions of Reference Example 1 and Example 1 showed reduced electrical fatigue compared to a magenta LEP ink containing no basic dispersant. However, the composition of Reference Example 1 was found to show high background effects (ink particles deposited in background areas—the OD of each of the background print checks was found to be much greater than 0.02 for 16 separations at zero coverage for the background print checks printed during the 20 kimp of the ink of Reference Example 1). The composition of Example 1 comprising the amine-containing basic dispersant having a TBN of less than 70 mgKOH/g (the dispersant used had a TBN of 45-50 mgKOH/g) was found to reduce the background effect problem (the OD of each of the background print checks was found to be well below 0.02 for 16 separations at zero coverage for the background print checks printed during the 20 kimp of the ink of Example 1) in addition to reducing electrical fatigue.

The inventors have found that LEP inks containing an amine-containing basic dispersant described herein address the electrical fatigue problem and minimise background side effects.

The inventors have found that LEP inks containing an amine-containing basic dispersant described herein address the electrical fatigue problem and minimise side effects, such as reduced optical density. Further experiments conducted on magenta LEP inks indicate that the results may be further improved when the amount of basic dispersant used in the magenta LEP inks is in the range of 8-15 wt. % by total weight of colorant.

The inventors produced a cyan LEP ink composition in a similar way to the magenta LEP ink produced in Example 1. Initial experiments suggest the cyan LEP ink composition also shows improvements in electrical fatigue along with improved (i.e. reduced) background effects.

While the electrostatic ink compositions, methods and related aspects have been described with reference to certain examples, it will be appreciated that various modifications, changes, omissions, and substitutions can be made without departing from the spirit of the disclosure. It is intended, therefore, that the electrostatic ink compositions, methods and related aspects be limited only by the scope of the following claims. Unless otherwise stated, the features of any dependent claim can be combined with the features of any of the other dependent claims, and any other independent claim.

The invention claimed is:

1. A method of producing a liquid electrophotographic (LEP) ink composition, the method comprising:

first combining:

a colorant selected from the group consisting of a magenta colorant, a cyan colorant and a black colorant, and wherein the colorant is selected from the group consisting of diketopyrrolopyrrole, perinone, phthalein, pyranthrone, pyrazoloquinazolinone, pyrroledione, and benzimidazolone; and an amine-containing basic dispersant having a total base number (TBN) in the range of about 10 to about 65 mgKOH/g material, the amine-containing basic dispersant present in an amount from about 5 wt. % to about 40 wt. % by total weight of colorant, to form colorant particles comprising the combined colorant and basic dispersant; and grinding a resin and the colorant particles in the presence of a carrier liquid.

2. The method according to claim 1, wherein the amine-containing basic dispersant has a TBN in the range of about 15 to about 50 mg/KOH/g material.

3. The method according to claim 1, wherein the dispersant is of formula (I)

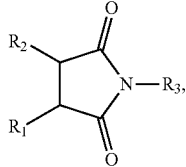

formula (I)

wherein $R_1$, $R_2$ and $R_3$ are selected from the group consisting of an amine-containing head group, a hydrocarbon tail group, and hydrogen; wherein at least one of $R_1$, $R_2$ and $R_3$ comprises a hydrocarbon tail group; and wherein at least one of $R_1$, $R_2$ and $R_3$ comprises an amine-containing head group.

4. The method according to claim 3, wherein:
$R_1$ is of formula (II)

P-L-   formula (II), wherein P is or comprises polyisobutylene and L is selected from the group consisting of a single bond, $(CH_2)_n$, wherein n is from 0 to 5, —O— and —NH—;
$R_2$ is H; and
$R_3$ is of formula (III)

$(CH_2)_m[(CH_2)_o NH(CH_2)_p]_q(CH_2)_r$—$NH_2$   formula (III), wherein m is at least 1, o is 0, 1 or 2, p is 1 or 2, q is 0 to 10, and r is 0 to 10.

5. The method according to claim 4, wherein L is —$CH_2$—, $R_2$ is H, m is 1, and q is 0 to 10.

6. The method according to claim 1, wherein the basic dispersant comprises a polyisobutylene succinimide polyethylene amine non-ionic dispersant.

* * * * *